(12) United States Patent
Akkarakaran et al.

(10) Patent No.: US 10,880,058 B2
(45) Date of Patent: Dec. 29, 2020

(54) TRANSMITTING UPLINK CONTROL INFORMATION (UCI)

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/961,344

(22) Filed: Apr. 24, 2018

(65) Prior Publication Data

US 2018/0309552 A1     Oct. 25, 2018

Related U.S. Application Data

(60) Provisional application No. 62/489,970, filed on Apr. 25, 2017.

(51) Int. Cl.
*H04L 5/00* (2006.01)
*H04W 72/04* (2009.01)
*H04L 27/26* (2006.01)

(52) U.S. Cl.
CPC .......... *H04L 5/0044* (2013.01); *H04L 5/0048* (2013.01); *H04L 5/0051* (2013.01); *H04L 5/0053* (2013.01); *H04L 27/2613* (2013.01); *H04W 72/0413* (2013.01)

(58) Field of Classification Search
CPC ... H04L 5/0044; H04L 5/0048; H04L 5/0051; H04L 5/0053; H04L 27/2613; H04W 72/0413
See application file for complete search history.

(56) References Cited

U.S. PATENT DOCUMENTS

| | | | |
|---|---|---|---|
| 2015/0036607 A1* | 2/2015 | Park | H04L 1/1861 370/329 |
| 2015/0156764 A1* | 6/2015 | Yang | H04L 5/001 370/329 |
| 2017/0374658 A1* | 12/2017 | Kim | H04L 1/1896 |
| 2018/0124815 A1* | 5/2018 | Papasakellariou | H04L 1/1861 |
| 2018/0191483 A1* | 7/2018 | Yamazaki | H04L 5/0051 |
| 2018/0198569 A1* | 7/2018 | Lyu | H04B 7/0626 |
| 2018/0199268 A1* | 7/2018 | Wang | H04W 48/12 |
| 2018/0309552 A1 | 10/2018 | Akkarakaran et al. | |

(Continued)

FOREIGN PATENT DOCUMENTS

WO     2017038337 A1     3/2017

OTHER PUBLICATIONS

International Search Report and Written Opinion—PCT/US2018/029469—ISA/EPO—dated Sep. 18, 2018.

(Continued)

*Primary Examiner* — Chi H Pham
*Assistant Examiner* — Weibin Huang
(74) *Attorney, Agent, or Firm* — Loza & Loza, LLP

(57) ABSTRACT

Aspects of the disclosure relate to wirelessly communicating information by embedding that information in a demodulation reference signal (DMRS) sequence. In some examples disclosed herein, a DMRS sequence may be configured to communicate uplink control information (UCI) in an uplink (UL) communication. Other aspects, configurations, and features are also claimed and described.

42 Claims, 9 Drawing Sheets

(56) References Cited

U.S. PATENT DOCUMENTS

| | | | | |
|---|---|---|---|---|
| 2019/0068423 | A1* | 2/2019 | Hwang | H04L 5/00 |
| 2019/0081722 | A1* | 3/2019 | Takeda | H04W 72/04 |
| 2019/0089504 | A1* | 3/2019 | Hwang | H04L 67/12 |
| 2019/0342915 | A1* | 11/2019 | Kim | H04W 72/0406 |
| 2019/0386863 | A1* | 12/2019 | Wang | H04L 27/2613 |
| 2020/0007285 | A1 | 1/2020 | Akkarakaran et al. | |
| 2020/0092876 | A1* | 3/2020 | Cho | H04W 72/0413 |

OTHER PUBLICATIONS

Motorola Mobility et al., "Further Discussion on Short Duration Uplink Control Channel", 3GPP Draft; R1-1703046, Further Discussion on Short PUCCH, 3rd Generation Partnership Project (3GPP), Mobile Competence Centre, 650, Route Des Lucioles, F-06921 Sophia-Antipolis Cedex, France, vol. RAN WG1, No. Athens, Greece; Feb. 13, 2017-Feb. 17, 2017 Feb. 7, 2017, XP051221834, Retrieved from the Internet: URL:http://www.3gpp.org/ftp/tsg_ran/WG1_RL1/TSGR1_88/Docs/ [retrieved on Feb. 7, 2017], 4 pages.

NTT DOCOMO et al., "Sequence-based PUCCH vs DMRS-based PUCCH", 3GPP Draft; R1-1705739, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017 Apr. 2, 2017, XP051243854, Retrieved from the Internet: URL:http://www.3gpp.org/ftp/Meetings_3GPP_SYNC/RAN1/Docs/ [retrieved on Apr. 2, 2017], 9 pages.

* cited by examiner

TRANSMITTING UPLINK CONTROL INFORMATION (UCI)

PRIORITY CLAIM

This application claims priority to and the benefit of provisional patent application No. 62/489,970 filed in the U.S. Patent and Trademark Office on Apr. 25, 2017, the entire content of which is incorporated herein by reference as if fully set forth below in its entirety and for all applicable purposes.

TECHNICAL FIELD

The technology discussed below relates generally to wireless communication systems, and more particularly, to systems and methods for transmitting uplink control information (UCI).

INTRODUCTION

Wireless communications from an uplink (UL) standpoint typically use a demodulation reference signal (DMRS) sequence known by a base station for channel estimation to demodulate received data. The DMRS sequence typically does not convey information from higher layers. However, as demand for efficient information transmission and mobile broadband access continues to increase, multiple uses can be assigned to certain aspects of wireless communication to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to embedding information in a demodulation reference signal (DMRS) sequence. In some examples disclosed herein, a DMRS sequence may be configured to communicate uplink control information (UCI) in an uplink (UL) communication. Other aspects, configurations, and features are also claimed and described.

In one example, a method of communicating information embedded in a DMRS sequence is disclosed. This method includes selecting a first DMRS sequence from a plurality of DMRS sequences to be used in a wireless communication, wherein one or more of the plurality of DMRS sequences are configured to communicate the information over a physical channel, and transmitting the wireless communication.

In another example, an apparatus for wireless communication of information embedded in a DMRS is disclosed. This apparatus includes a transceiver, a memory, and at least one processor communicatively coupled to the transceiver and the memory, wherein the at least one processor is configured to select a first DMRS sequence from a plurality of DMRS sequences stored in the memory to be used in a wireless communication, wherein one or more of the plurality of DMRS sequences are configured to communicate the information over a physical channel, and transmit, via the transceiver, the wireless communication.

In another example, a method for combining control information with a payload in a wireless communication is disclosed. This method includes determining a first bit size of a first control information and determining a second bit size of the payload, comparing the first bit size with the second bit size to determine whether a threshold condition is satisfied, and combining the first control information with the payload if the threshold condition is satisfied, wherein the payload includes one or more of a second control information and message data.

In another example, an apparatus for combining control information with a payload in a wireless communication is disclosed. This apparatus includes a transceiver, a memory, and at least one processor communicatively coupled to the transceiver and the memory, wherein the at least one processor and the memory and configured to determine a first bit size of a first control information, determine a second bit size of the payload, compare the first bit size with the second bit size to determine whether a threshold condition is satisfied, and combine the first control information with the payload if the threshold condition is satisfied, wherein the payload includes one or more of a second control information and message data.

In another example, a method for receiving control information is disclosed. This method includes receiving a wireless communication including a DMRS sequence and control information, and determining the control information based on the DMRS sequence.

In another example, an apparatus for receiving control information is disclosed. This apparatus includes a transceiver, a memory, and at least one processor communicatively coupled to the transceiver and the memory, wherein the at least one processor and the memory are configured to receive a wireless communication including a DMRS sequence and the control information, and determine control information based on the DMRS sequence.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
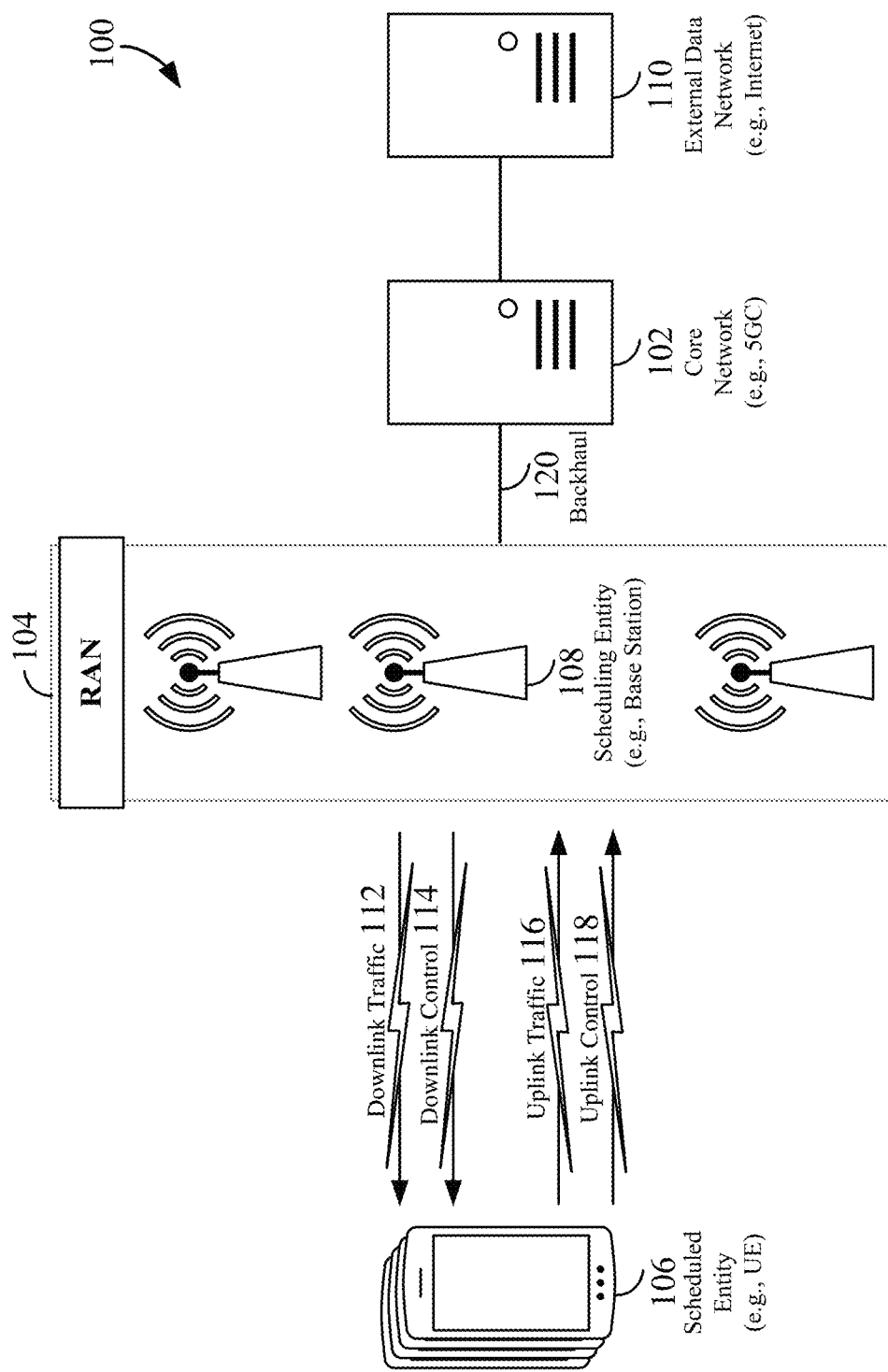
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
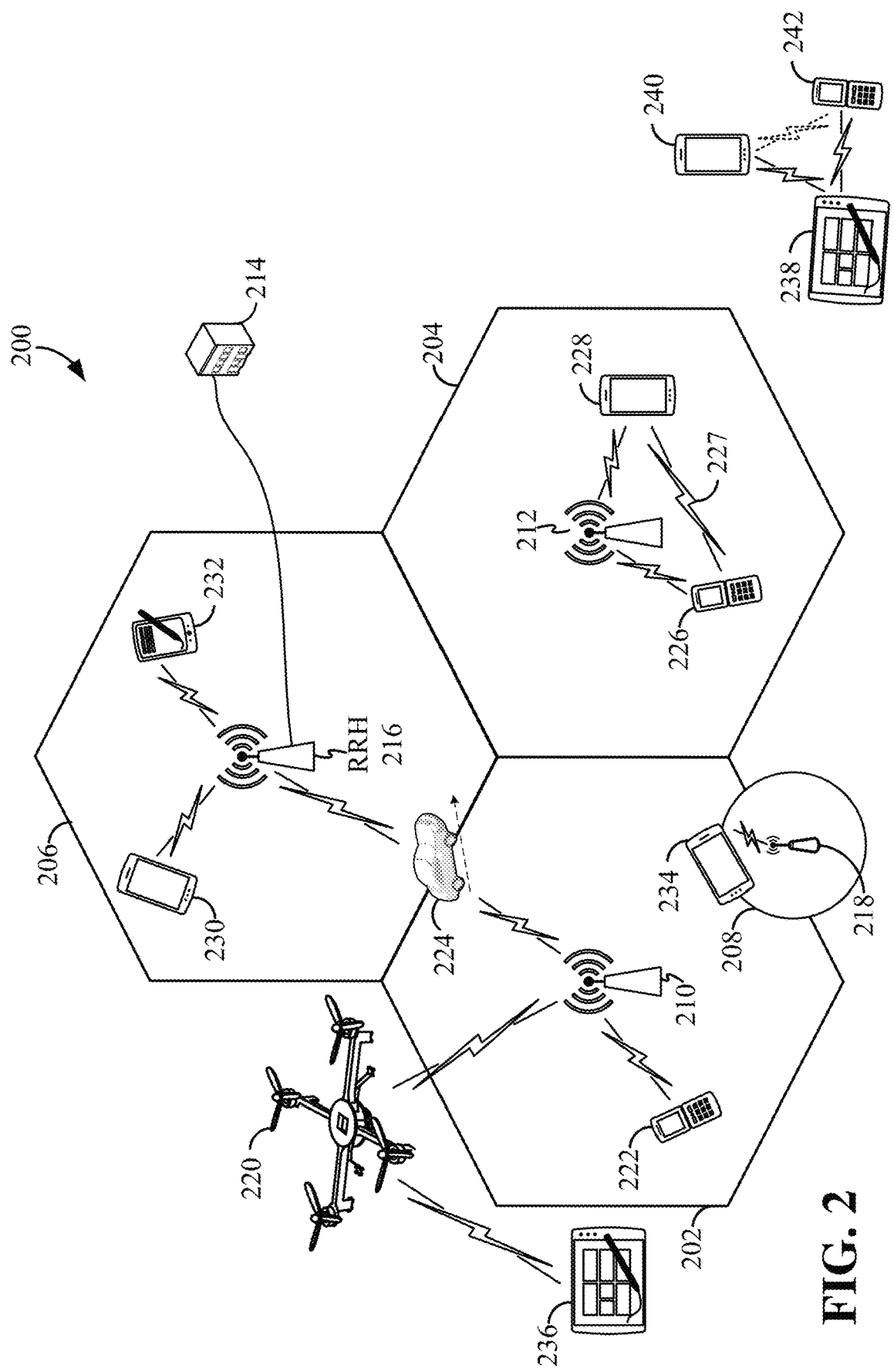
FIG. 2 is a conceptual illustration of an example of a radio access network (RAN).

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell.

Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., a first UE 226 and a second UE 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Figure 3:
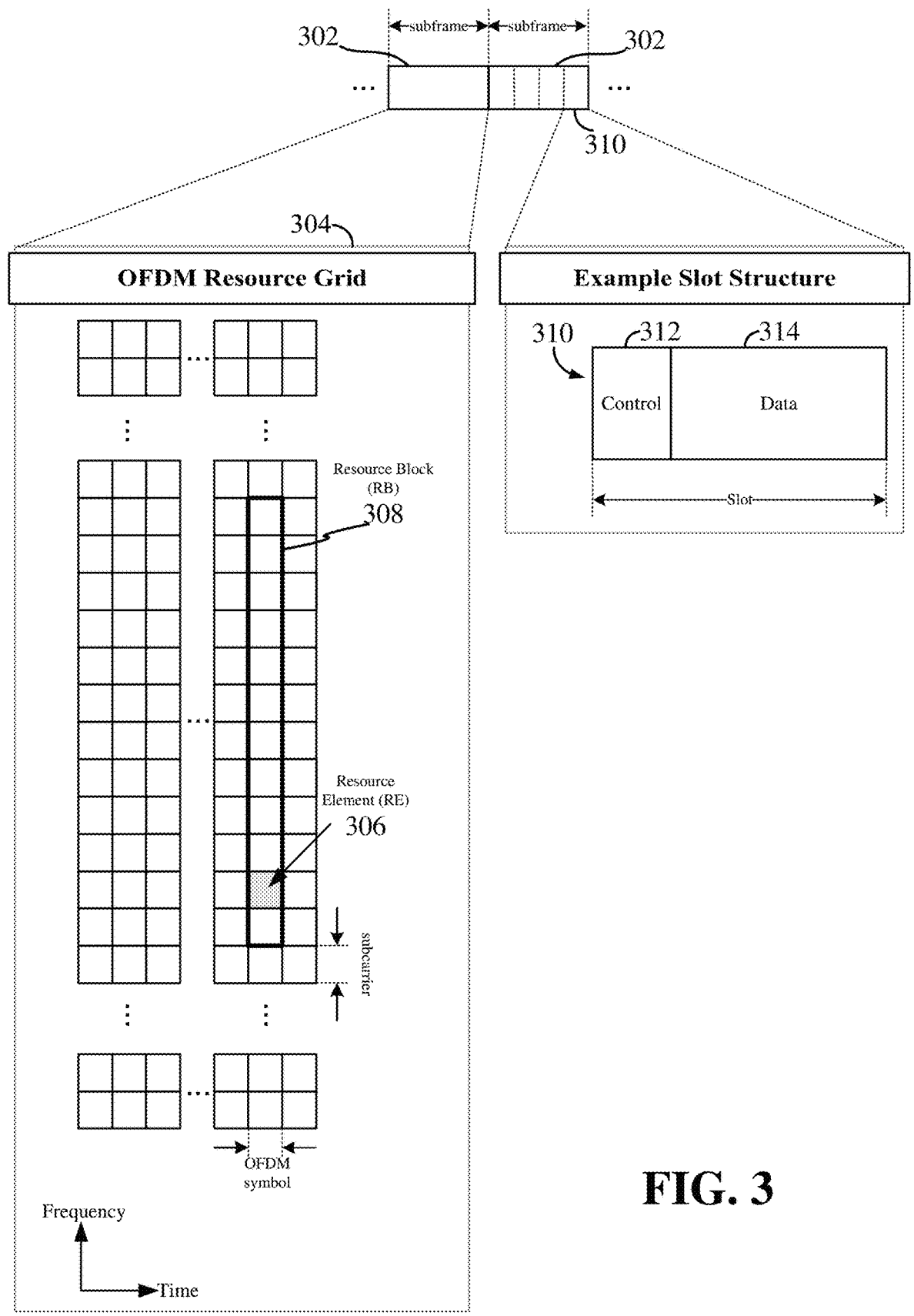
FIG. 3 is a schematic illustration of an organization of wireless resources in an air interface utilizing orthogonal frequency division multiplexing (OFDM).

Various aspects of the present disclosure will be described with reference to an OFDM waveform, as illustrated in FIG. 3. It should be understood by those of ordinary skill in the art that the various aspects of the present disclosure may be applied to a DFT-s-OFDM waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 408. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
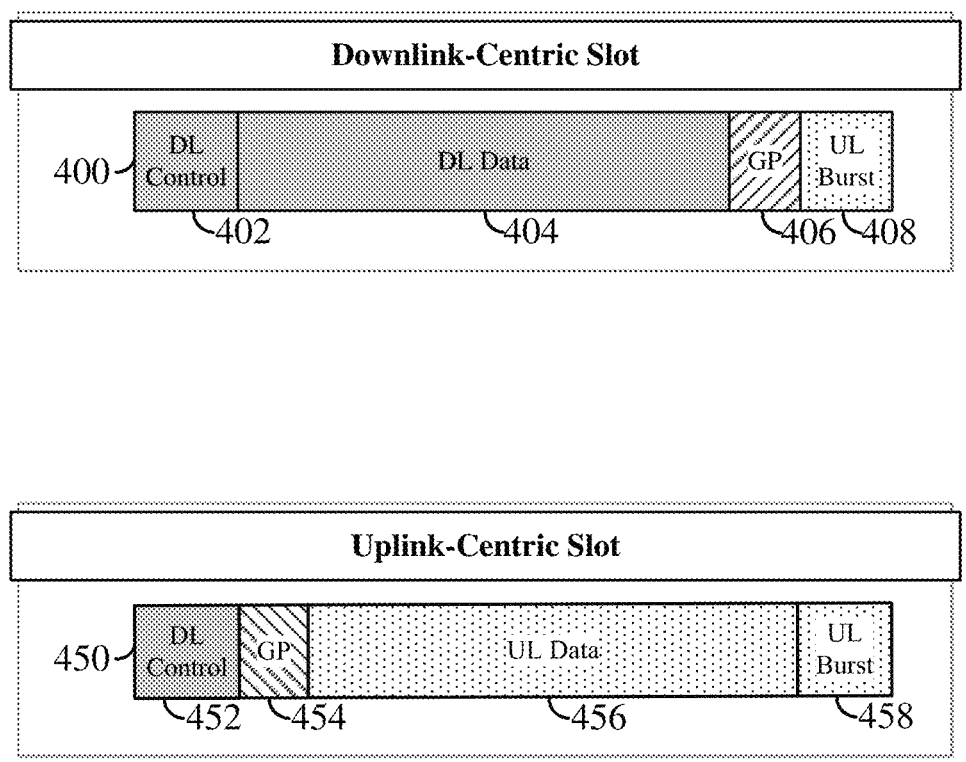
FIG. 4 is a conceptual diagram of exemplary self-contained slots according to some aspects of the disclosure.

According to an aspect of the disclosure, one or more slots may be structured as self-contained slots. For example, FIG. 4 illustrates two example structures of self-contained slots 400 and 450. The self-contained slots 400 and/or 450 may be used, in some examples, in place of the slot 310 described above and illustrated in FIG. 3.

In the illustrated example, a DL-centric slot 400 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 450 may be a receiver-scheduled slot, wherein more resources are allocated for transmissions in the UL direction (e.g., transmissions from the scheduled entity 106 to the scheduling entity 108).

Each slot, such as the self-contained slots 400 and 450, may include transmit (Tx) and receive (Rx) portions. For example, in the DL-centric slot 400, the scheduling entity 108 first has an opportunity to transmit control information, e.g., on a PDCCH, in a DL control region 402, and then an opportunity to transmit DL user data or traffic, e.g., on a PDSCH in a DL data region 404. Following a guard period (GP) region 406 having a suitable duration 410, the scheduling entity 108 has an opportunity to receive UL data and/or UL feedback including any UL scheduling requests, CSF, a HARQ ACK/NACK, etc., in an UL burst 408 from other entities using the carrier. Here, a slot such as the DL-centric slot 400 may be referred to as a self-contained slot when all of the data carried in the data region 404 is scheduled in the control region 402 of the same slot; and further, when all of the data carried in the data region 404 is acknowledged (or at least has an opportunity to be acknowledged) in the UL burst 408 of the same slot. In this way, each self-contained slot may be considered a self-contained entity, not necessarily requiring any other slot to complete a scheduling-transmission-acknowledgment cycle for any given packet.

The GP region 406 may be included to accommodate variability in UL and DL timing. For example, latencies due to radio frequency (RF) antenna direction switching (e.g., from DL to UL) and transmission path latencies may cause the scheduled entity 106 to transmit early on the UL to match DL timing. Such early transmission may interfere with symbols received from the scheduling entity 108. Accordingly, the GP region 406 may allow an amount of time after the DL data region 404 to prevent interference, where the GP region 406 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 450 may be configured as a self-contained slot. The UL-centric slot 450 is substantially similar to the DL-centric slot 400, including a DL control region 450, a guard period 454, an UL data region 456, and an UL burst region 458.

The slot structure illustrated in slots 400 and 450 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Communicating Information by the DMRS

The UL burst 408 of the DL-centric slot 400, and the UL data region 456 and UL burst region 458 of the UL-centric slot 450 can each include one or more DMRS sequences. A DMRS sequence may occupy one or more resource elements 306 in each UL region, typically being in the first one or two symbols. In some aspects of the disclosure a first UE 226 chooses a DMRS sequence from a set of N known DMRS sequences. In this way, $\log_2(N)$ bits of uplink control information (UCI) can be communicated using specific DMRS sequences. The UCI may include one or more of a HARQ ACK/NACK, a scheduling request, channel state information (CSI), channel quality information (CQI), preceding matrix indicator (PMI), rank indicator (RI), procedure transaction identifier (PTI), discontinued transmission/reception (DTX/DRX), etc.

The first UE 226 then communicates a UL transmission to a base station 212, where the UL transmission includes the UCI payload within the DMRS. The set of N possible DMRS sequences are known between at least the first UE and the base station 212. For example, DMRS information containing the N possible DMRS sequences may be stored in a memory on each of the base station 212 and the first UE 226. In another configuration, the set of N possible DMRS sequences may also be known to a second UE 228, thereby allowing direct D2D communication between the second UE 228 and both of the first UE 226 and the base station 212. The DMRS sequence may be chosen based on the UCI information to be communicated using a look-up table that is stored within the DMRS information. The look-up table may include particular UCI information and/or particular combinations of UCI information that correspond to each of the N known DMRS sequences. For example, a particular DMRS sequence communicated from the first UE 226 to the base station 212 may correspond to a HARQ ACK message. The look-up table may include a one-to-one correspondence between the DMRS sequence and the at least one UCI payload. Table 1 below illustrates an example of such a look-up table.

| UCI payload (X) | DMRS Sequence |
|---|---|
| ACK | 1 |
| NACK | 2 |
| DTX/DRX | 3 |

In this example, the first UE 226 communicates a HARQ ACK message to the base station 212 via DMRS sequence 1.

In one configuration, the first UE 226 chooses at least one DMRS sequence for a UL transmission, and configures the UL data region 456 and/or the UL burst region 458 to include the chosen sequence(s). For example, the first UE 226 may communicate a HARQ ACK message to the base station 212 by selecting DMRS sequence 1 for transmission in the UL data region 456. The same process can be used in the UL burst region 408 of the DL-centric slot 400. Note that any suitable number of DMRS sequences N may be utilized to correspond to any UCI payload X. In this case, when the base station 212 receives the UL transmission including the DMRS sequence, it may confirm a relationship between the DMRS sequence and the UCI payload by determining which DMRS sequence was communicated in the UL transmission, and determining which UCI(s) correspond to the DMRS sequence. In one example, the base station 212 may establish a magnitude of correlation against the N possible DMRS sequences in the stored DMRS information to determine which DMRS sequence was communicated in the UL transmission. DMRS sequences can be chosen by the first UE to be orthogonal to one another or have low cross correlation between one another.

DMRS sequences may have an embedded pilot sub-sequence that is common among all or a portion of the N possible choices of DMRS sequences. The embedded pilot sub-sequences may be utilized for channel estimation to aid in detecting which DMRS sequence was transmitted. For example, a common pilot sub-sequence (e.g., a first pilot sub-sequence) may be embedded in DMRS sequence 1 (corresponding to a first ACK), DMRS sequence 2 (corresponding to a first NACK), and DMRS sequence 3 (corresponding to a first DTX). In another example, in addition to the first pilot sub-sequence being embedded in DMRS sequences 1-3, a second pilot sub-sequence may be embedded in a DMRS sequence 4 (corresponding to a second ACK), a DMRS sequence 5 (corresponding to a second NACK), and a DMRS sequence 6 (corresponding to a second DTX). In this example, the first pilot sub-sequence is distinguishable from the second pilot sub-sequence. Such distinguishing features may be utilized by the base station 212 to establish a UE specific parameter (e.g., UE identity) associated with the UL transmission. In another example, each of the N possible choices of DMRS sequences or the portion of the N DMRS sequences may include a unique embedded pilot sub-sequence. In this example, a single DMRS sequence may correspond to a plurality of UCIs. However, the single DMRS sequence may include an embedded pilot sub-sequences that corresponds to a unique one of the plurality of UCIs. Thus, a common DMRS sequence may be used to communicate a plurality of UCIs, wherein the embedded pilot sub-sequence distinguishes the common DMRS sequence to a unique one of the plurality of UCIs.

After detecting which DMRS sequence was transmitted, the base station 212 can then use the received DMRS sequence to perform channel estimation and demodulate payload data associated with the UL transmission (e.g., other UCI information and/or PUSCH data). PUSCH payloads typically go through HARQ procedure, while UCIs typically do not. Thus, in order to govern UL transmissions that include both UCI and PUSCH data, a scheduling entity 108 (e.g., base station 212) may be configured to drop certain data in order to reduce latency. For example, because a common UCI payload may be carried across all HARQ retransmissions, the base station 212 and/or the scheduled entity 106 (e.g., first UE 226) may be configured to ignore a UCI carried in this manner if the number of HARQ transmissions exceed a threshold. In one example, the threshold could be 1 (i.e., the UCI is only considered valid if it is decoded at the first transmission). In another configuration, a maximum number of HARQ transmissions allowed may be dynamically generated by the base station 212 and signaled to the first UE 226 in a DCI containing a PUSCH grant. In this example, the threshold may be set to a relatively lower value for PUSCH grants associated with a payload including both UCI and PUSCH data, than for a PUSCH grant associated with a payload that does not include UCI data. In another configuration, the first UE 226 may segment a payload of an UL transmission into multiple, independently acknowledged code block groups (CBGs). In this example, the base station 212 may generate threshold values corresponding to the maximum number of HARQ retransmissions, where a first threshold value corresponding to CBGs containing UCI data may be different than a second threshold value corresponding to CBGs that do not.

In one configuration, the value of N may be limited to reduce complexity. For example, the value of N may be chosen to carry non-binary UCI types. In one non-limiting example, setting N=3 may allow for a three-state UCI provided within the corresponding DMRS. One example of a three-state UCI may include a three-state ACK that can provide information that is in addition to the standard ACK/NACK. The three-state ACK can reflect complex states, such as, (i) no PDCCH detected, (ii) PDCCH detected but PDSCH CRC failed, and (iii) PDCCH detected and PDSCH CRC passed. As such, it may be possible to distinguish between the PDCCH not being detected, and the PDCCH being detected but the CRC failing after decoding the corresponding PDSCH. In another configuration, a scheduled entity 106 may provide an ACK (i.e., PDCCH detected and PDSCH CRC passed), a NACK (i.e., PDCCH detected but PDSCH CRC failed), or a discontinued transmission/reception (DTX/DRX) message over the DMRS. The three-state ACK is being used as an example, however other non-binary UCI types and corresponding N values are contemplated.

In another configuration, the scheduled entity 106 (e.g., first UE 226) can assign a first power level to a UCI carried by a DMRS sequence of a slot, and a second power level to another UCI being communicated in the payload of the same slot. For example, the first UE 226 may communicate an UL transmission containing a first UCI (e.g., a 2-bit ACK) via a DMRS sequence, as well as a second UCI (e.g., a 1-bit ACK) via a PUCCH. In this example, the first UE 226 may be communicating a three-state ACK to the base station 212. As such, the first UCI and the second UCI can be assigned different reliability requirements due to demodulation requirements being different for each. For example, first UE 226 can modulate a transmission power level of each of the first UCI and the second UCI to indicate or impose upon the base station 212 distinctive decoding reliability requirements for each UCI. In this example, the first UE 226 may increase the transmission power level on information deemed important (e.g., the first UCI of the DMRS), and decrease (i.e., reduce relative to the increase power level, or leave at a nominal or default level) the power for information that is relatively less important (e.g., the second UCI of the PUCCH). Selectively modulating power allows the first UE 226 to generate a delta offset between different UCIs of the same slot to indicate degrees of reliability, and also to employ power saving measures.

In another configuration, latency requirements of different UCIs can be controlled by strategically configuring a particular arrangement of the UCIs within a slot. Such a configuration is beneficial for enabling a scheduled entity 106 and/or a scheduling entity 108 to establish a timeline prioritization of information. As noted above, the DMRS sequence is generally "up front" or at the beginning of any of the UL burst and/or UL data region of a slot. As such, this property of the DMRS sequence can be utilized to front-load a particular UCI (e.g., a first UCI) in the UL region of a transmission. For example, if the first UE 226 is transmitting a UL-centric slot 450 that includes at least two UCIs, the first UE 226 can determine that the first UCI should receive timeline prioritization over a second UCI. In this case, the first UCI may be carried on the DMRS and the second UCI may be carried via the PUCCH. In this example, the arrangement of the UCIs within the slot results in the first UCI being processed earlier than the second UCI. In this example, the first UE 226 may establish a timeline of prioritization by selecting one or more DMRS sequences based on a priority of one or more UCIs.

In one aspect, the priority of a UCI may be a function of a priority of data that the UCI is in response to. For example, if the UCI is a 1-bit ACK associated with mission critical data received by the first UE 226, then the first UE 226 may choose a DMRS sequence associated with a 1-bit ACK instead of transmitting the 1-bit ACK by the PUCCH. In this example, the priority of the 1-bit ACK was established by the priority of the mission critical data received by the first UE 226. In some configurations, mission critical data refers to data that has a relatively high reliability requirement. For example, the reliability requirement of mission critical data may be greater than the reliability requirement of other data included in that subframe. Generally, reliability refers to how consistently data is successfully received by the intended destination without errors.

In another aspect, the priority of the UCI may be a function of the type of UCI. For example, the priority may be determined by characteristics of the UCI, including number of bits, whether the UCI includes a CSI, an ACK, a NACK, and/or an SR. In one such example, a 1-bit UCI may have a relatively higher priority established by the number of bits of the UCI, whereas a 2-bit ACK may have a relatively lower priority due to having a greater number of bits. As such, whether the scheduled entity 226 chooses a particular DMRS sequence for a UCI may be a function of one or more of (i) the priority of the data that the UCI is in response to, (ii) the type of UCI, and (iii) the bit size of the UCI.

Communicating Information in a Single Payload

One alternative to transmitting UCI information by the DMRS is to bundle the bits of UCIs into a single PUCCH/PUSCH payload. In one example, an SR may be bundled with a larger payload. The larger payload may include one or more types of UCIs (e.g., CSI, CQI, HARQ ACK/NACK, etc.) and a data portion for PUCCH/PUSCH transmission. While the SR may include one or more bits indicating whether the scheduled entity 106 is requesting resources for UL data transmissions, the SR may increase in bit-size when additional bits are added to convey information about the amount and/or type of resources the scheduled entity 106 needs. For example, in addition to or in replacement of the one bit, the SR can also include a buffer status report (BSR). In this case, data bits may be stored in a buffer prior to being communicated in an UL transmission. The BSR can include the number of bits stored in that buffer, providing the scheduling entity 108 with information regarding an amount of resources the scheduled entity 106 needs. The BSR may include explicit data indicating the length of the buffer. However, in some examples, the BSR may provide data that of reduced granularity than that of the explicit length to reduce latency. In such a case, with no more than two bits, the BSR can indicate a general capacity of the buffer. The BSR may include a first data including explicit information indicating the length of the buffer. However, in some examples, the BSR may instead include a second data including information of a reduced granularity relative to that of the first data to reduce latency. For example, instead of providing explicit information indicating the length of the buffer, the BSR may be reduced in bit size to indicate a general capacity of the buffer. In such a case, the BSR may be reduced to no more than two bits. A determination to communicate the BSR having the first data or the second data may be based on various priority metrics associated with one or more of the UCI or the PUCCH/PUSCH payload. Generally, priority refers to the importance or time-sensitivity of the data. A first data having relatively higher importance may not be modified, or reduced in size. However, a first data having relatively greater time-sensitivity may be modified so that the data may be received before other data having relatively lesser importance and/or relatively lesser time-sensitivity.

For example, the scheduled entity 106 may choose to bundle a UCI such as an SR with another UCI payload if the other UCI payload meets a threshold size requirement. In this example, the threshold size requirement may be determined based on single-payload information stored in a memory. The single-payload information may be communicated between the scheduled entity 106 and the scheduling entity 108. The single-payload information may include a relationship between a number of bits (M) of a UCI (e.g., SR), and a number of bits in the other UCI payload (X). Such a relationship may be based on a stored table of a set of allowed M vales and corresponding X values. The look-up table may contain a one-to-one correspondence between the threshold number of bits in the other UCI payload and the number of bits in the UCI. Table 2 below illustrates an example of such a table.

| Threshold number of bits in the other UCI payload (X) | Number of bits of the UCI (M) |
|---|---|
| <11 | 0 |
| 11 | 1 |
| 55 | 2 |
| 275 | 3 |

In this example, if the other UCI payload contains 55 or more bits, then the SR can be added to the payload so long as the SR contains 2 or fewer bits. As discussed further below, the threshold may be dynamic and set based on reserved resources by either of the scheduling entity 108, or the scheduled entity 106.

In another configuration, a UCI may be bundled into a single payload opportunistically based on resources available to either, or both of, the scheduled entity 106 and the scheduling entity 108. For example, the scheduled entity 106 may operate by reserving resources for sending requested information, and limiting bundling of information to instances when the information is requested. In such a case, an RRC, MAC-CE (MAC Control Element), DCI, or other control command exchange can trigger the scheduled entity to report a UCI (e.g., CQI, PMI, RI, PTI, etc.), which can be bundled so long as the reported UCI meets the threshold size. Alternatively, the RRC, MAC-CE, DCI, or other control command exchange may specify the threshold size.

One or both of the scheduled entity 106 and the scheduling entity 108 may determine whether to transmit UCI information by embedding it in the DMRS, or bundling it with another payload. Such a determination may be based on a number of parameters. Such parameters include, a bit size of a UCI, how reliable the UCI is required to be, the processing requirements of either, or both of, the scheduled entity 106 and the scheduling entity 108, power requirements, amount of available resources of either, or both of, the scheduled entity 106 and the scheduling entity 108.

Figure 5:
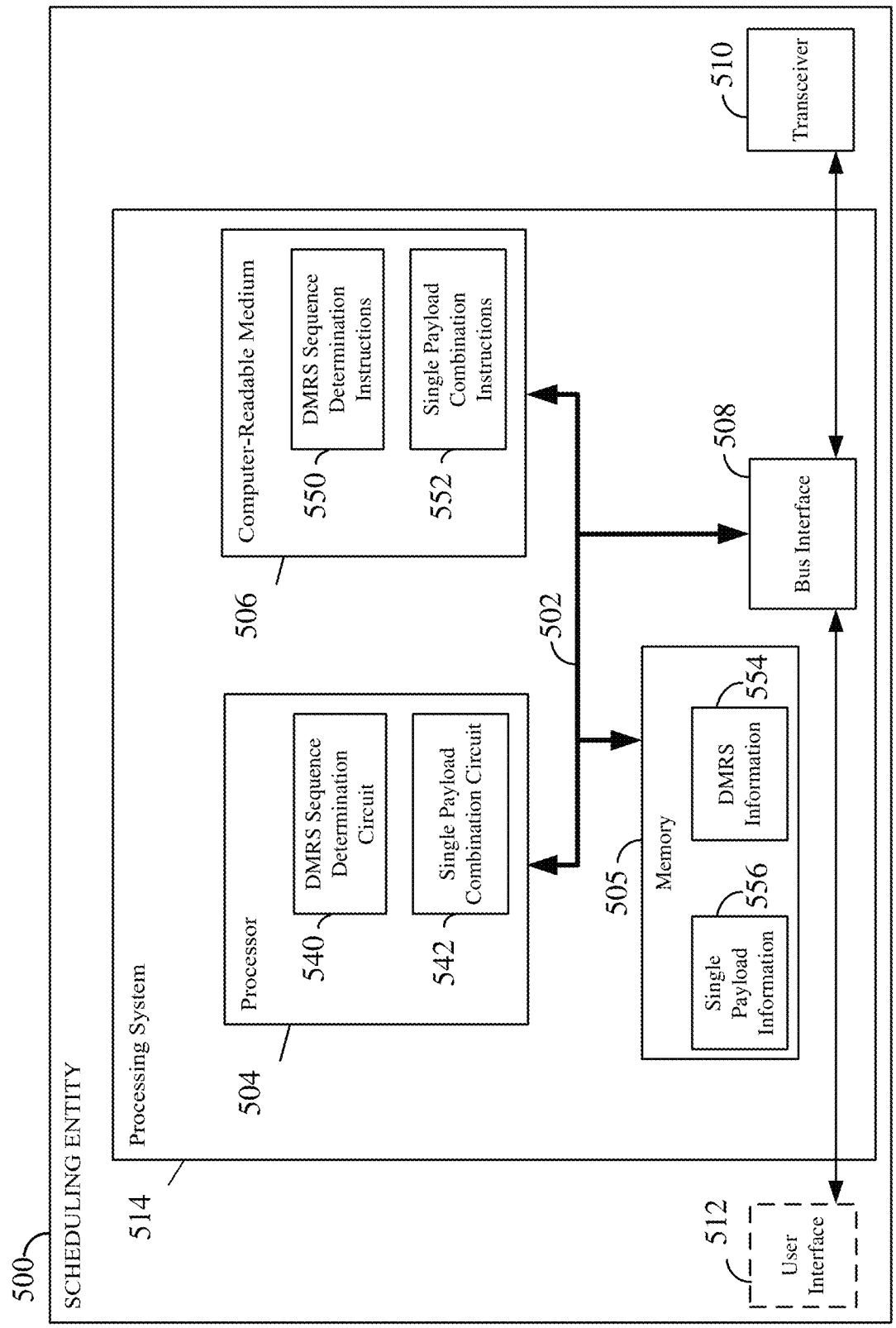
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be a user equipment (UE) as illustrated in any one or more of FIGS. 1 and/or 2. In another example, the scheduling entity 500 may be a base station as illustrated in any one or more of FIGS. 1 and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in FIGS. 7-9.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided.

In some aspects of the disclosure, the processor 504 may include circuitry for determining a DMRS sequence 540 received in an UL communication. For example, the scheduling entity 500 may receive, by the transceiver 510, an UL message including a DMRS sequence and at least one UCI. The at least one UCI may include any of a CSI, CQI, HARQ ACK/NACK, etc.

The circuitry for determining a DMRS sequence 540 may determine whether the received DMRS sequence is configured to communicate a UCI by comparing the DMRS sequence with DMRS information 554 stored in the memory 505. The DMRS information 554 may include a look-up table including a plurality of DMRS sequences and their corresponding UCIs. Using the stored DMRS information 554, the circuitry for determining a DMRS sequence 540 may determine which UCI is being communicated by the received DMRS sequence.

The circuitry for determining a DMRS sequence 540 may also determine whether the received DMRS sequence includes an embedded pilot sub-sequence that corresponds to a UCI. For example, if the circuitry for determining a DMRS sequence 540 determines that the DMRS sequence contains an embedded pilot sub-sequence, the circuitry may compare the embedded pilot sub-sequence with another look-up table contained in the DMRS information 554 stored in the memory 505. The DMRS information 554 may include the other look-up table containing a plurality of pilot sub-sequences and their corresponding UCIs. Using the stored DMRS information 554, the circuitry for determining a DMRS sequence 540 may determine which UCI was communicated by the embedded pilot sub-sequence contained within the DMRS sequence.

The circuitry for determining a DMRS sequence 540 may also generate and communicate non-binary UCI types to the scheduled entity. In one non-limiting example, the circuitry for determining a DMRS sequence 540 may set N=3 for a three-state UCI communicated within a corresponding DMRS by the transceiver 510. The circuitry for determining a DMRS sequence 540 may store the non-binary UCI types in the DMRS information 554 in the memory 505, and communicate the non-binary UCI types to the scheduled entity via the transceiver 510. The three-state ACK is being used as an example, however other non-binary UCI types and corresponding N values are contemplated.

In another configuration, the circuitry for determining a DMRS sequence 540 may assign a first power level to a UCI carried by a DMRS sequence of a slot, and a second power level to another UCI being communicated in the payload of the same slot. The power levels and corresponding UCIs may be stored in the DMRS information 554 and communicated to the scheduled entity. The circuitry for determining a DMRS sequence 540 may assign different reliability requirements to the first UCI and the second UCI due to demodulation requirements being different for each.

In another configuration, the circuitry for determining a DMRS sequence 540 may determine latency requirements for different UCIs and strategic configurations of the UCIs within a slot. The arrangement of the UCIs within the slot results in one UCI being processed earlier than another UCI in the same slot. The scheduling entity 500 may store the latency requirements and strategic configurations in the DMRS information 554 in the memory 605.

In some examples, the priority of the UCI may be a function of the type of UCI. For example, the priority may be determined by characteristics of the UCI, including number of bits, whether the UCI includes a CSI, an ACK, a NACK, and/or an SR. In one such example, a 1-bit UCI may have a relatively higher priority established by the number of bits of the UCI, whereas a 2-bit ACK may have a relatively lower priority due to having a greater number of bits. As such, the circuitry for determining a DMRS sequence 540 may generate and select a particular DMRS sequence for a UCI, wherein the selection may be based on a function of one or more of (i) the priority of the data that the UCI is in response to, (ii) the type of UCI, and (iii) the bit size of the UCI. The particular function may be stored in the DMRS information 554 in the memory 505.

In some examples, the circuitry for determining a DMRS sequence 540 may generate the DMRS information 554 and communicate it to a scheduled entity so that both the scheduling entity 500 and the scheduled entity have the same DMRS information 554. The circuitry for determining a DMRS sequence 540 may operate in coordination with the DMRS sequence determination software 550.

The processor 504 may include circuitry for determining a single payload combination 542. In one example, the single payload combination circuit 542 may generate instructions and/or parameters for the scheduled entity to use in combining a UCI into a single payload in an UL communication. In such a case, an RRC, MAC-CE (MAC Control Element), DCI, or other control command exchange generated by the processor 504 may include single payload information 556 generated by the single payload combination circuit. The scheduling entity may communicate the control command exchanged with the scheduled entity by the transceiver 510, and store the single payload information 556 in the memory 505. The single payload information 556 may be configured to trigger the scheduled entity to report a UCI (e.g., CQI, PMI, RI, PTI, etc.) bundled with an UL payload so long as the reported UCI meets a threshold size. The RRC, MAC-CE, DCI, or other control command exchange may specify the threshold size. The circuitry for single payload combination 542 may operate in coordination with the single payload combination software 552.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include DMRS sequence determination software 550 configured for various functions, including, for example, selecting a first DMRS sequence from a plurality of DMRS sequences to be used in an UL message, wherein one or more of the DMRS sequences are configured to communicated a UCI, and transmit the UL message. The DMRS sequence determination software 550 may also be configured to receive an UL message including a DMRS sequence and at least one UCI, and determining the at least one UCI based on the DMRS sequence in the UL message. For example, the DMRS sequence determination software 550 may be configured to implement one or more of the functions described above in relation to FIGS. 7 and 9, including, e.g., blocks 702 and 704.

In one or more examples, the computer-readable storage medium 506 may include single payload combination software 552 configured for various functions, including, for example, determining a bit size of a UCI, comparing the bit size of the UCI with a threshold value based on the size of a payload, determining whether the UCI bit size is greater than the threshold value, determining whether UCI can be embedded in the DMRS, and combining the UCI with the payload. For example, the single payload combination software 552 may be configured to implement one or more of the functions described above in relation to FIG. 8, including, e.g., blocks 802-810.

Figure 6:
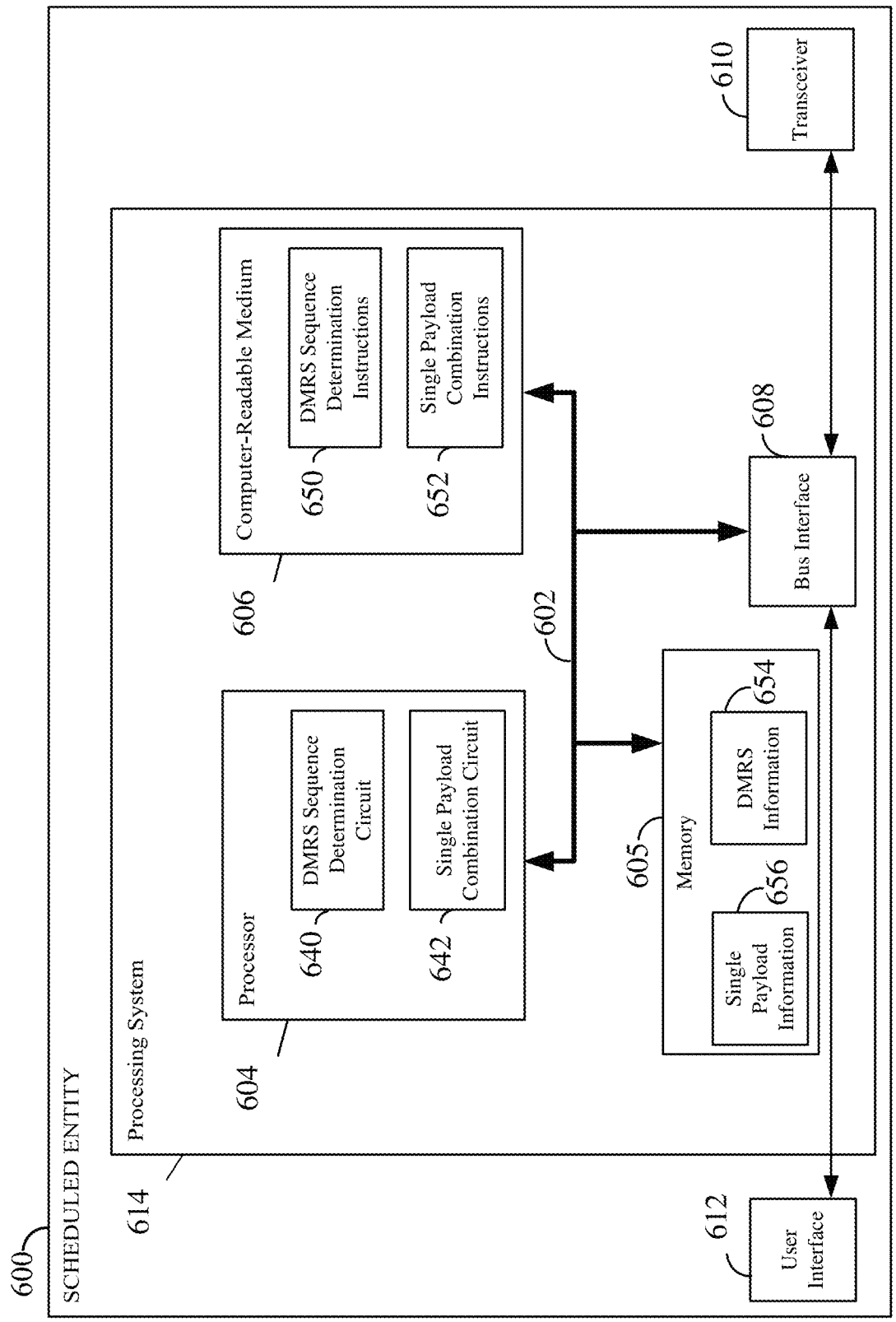
FIG. 6 is a block diagram conceptually illustrating an example of a hardware implementation for a scheduled entity according to some aspects of the disclosure.

FIG. 6 is a conceptual diagram illustrating an example of a hardware implementation for a scheduled entity 600 employing a processing system 614. For example, the scheduled entity 600 may be a user equipment (UE) as illustrated in any one or more of FIGS. 1 and/or 2. In another example, the scheduled entity 600 may be a base station as illustrated in any one or more of FIGS. 1, 2, and/or 5.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below and illustrated in FIGS. 7-9.

In some aspects of the disclosure, the processor 604 may include circuitry for determining a DMRS sequence 640 based at least on a latency requirement, power requirements, and/or a UCI type. In one configuration, the circuitry for determining a DMRS sequence 640 may select at least one DMRS sequence for a UL transmission, and configures the UL data region 456 and/or the UL burst region 458 to include the chosen sequence(s). For example, the circuitry for determining a DMRS sequence 640 may communicate a HARQ ACK message to the scheduling entity 500 by selecting a corresponding DMRS sequence for transmission by the transceiver 610. Any suitable number of DMRS sequences (N) may be utilized to correspond to any UCI payload. The N number of DMRS sequences may be stored as DMRS information in the memory 605. The circuitry for determining a DMRS sequence 640 may generate the DMRS information, or the scheduling entity 500 may generate the DMRS information 654 and communicate the DMRS information 654 to the scheduled entity 600. The scheduled entity 600 may receive the DMRS information 654 via the transceiver 610 and store the DMRS information 654 in the memory. DMRS sequences can be chosen by the circuitry for determining a DMRS sequence 640 to be orthogonal to one another or have low cross correlation between one another.

The circuitry for determining a DMRS sequence 640 may also select an embedded pilot sub-sequence from a plurality of pilot sub-sequences stored in the DMRS information 654 in the memory 605. For example, a common pilot sub-sequence (e.g., a first pilot sub-sequence) may be embedded in a DMRS sequence corresponding to a first ACK.

The circuitry for determining a DMRS sequence 640 may also generate and/or receive non-binary UCI types. In one non-limiting example, setting N=3 may allow for a three-state UCI communicated within a corresponding DMRS by the transceiver 610. The circuitry for determining a DMRS sequence 640 may store the non-binary UCI types in the DMRS information 554 in the memory 505, and communicate the non-binary UCI types to the scheduled entity via the transceiver 510. The three-state ACK is being used as an example, however other non-binary UCI types and corresponding N values are contemplated.

In another configuration, the circuitry for determining a DMRS sequence 640 may assign a first power level to a UCI carried by a DMRS sequence of a slot, and a second power level to another UCI being communicated in the payload of the same slot. The power levels and corresponding UCIs may be stored in the DMRS information 654 and communicated to the scheduled entity. For example, the scheduled entity 600 may communicate an UL transmission using the transceiver 610 and containing a first UCI (e.g., a 2-bit ACK) embedded in a DMRS sequence, as well as a second UCI (e.g., a 1-bit ACK) via a PUCCH. In this example, the scheduled entity 600 may be communicating a three-state ACK to the scheduling entity. As such, the circuitry for determining a DMRS sequence 640 may assign the first UCI and the second UCI different reliability requirements due to demodulation requirements being different for each. For example, the DMRS sequence determination circuit 640 may modulate a transmission power level of each of the first UCI and the second UCI to indicate distinctive decoding reliability requirements for each UCI.

In another configuration, the circuitry for determining a DMRS sequence 640 may determine latency requirements for different UCIs and strategically configure a particular arrangement of the UCIs within a slot. The arrangement of the UCIs within the slot results in one UCI being processed earlier than another UCI in the same slot. In another example, the scheduled entity 600 may receive the latency requirements and particular arrangements and store the information in the DMRS information 654.

In some examples, the priority of the UCI may be a function of the type of UCI. For example, the priority may be determined by characteristics of the UCI, including number of bits, whether the UCI includes a CSI, an ACK, a NACK, and/or an SR. In one such example, a 1-bit UCI may have a relatively higher priority established by the number of bits of the UCI, whereas a 2-bit ACK may have a relatively lower priority due to having a greater number of bits. As such, the DMRS sequence determination circuit 640 may generate and select a particular DMRS sequence for a UCI, wherein the selection may be based on a function of one or more of the (i) the priority of the data that the UCI is in response to, (ii) the type of UCI, and (iii) the bit size of the UCI. The particular function may be stored in the DMRS information 654 in the memory 605.

In some examples, the circuitry for determining a DMRS sequence 640 may generate the DMRS information 654 and communicate it to a scheduling entity so that both the scheduling entity and the scheduled entity 600 have the same DMRS information 654. The circuitry for determining a DMRS sequence 640 may operate in coordination with the DMRS sequence determination software 650.

The processor 604 may include circuitry for determining a single payload combination 642. In one example, the circuitry for single payload combination 642 may bundle the bits of UCIs into a single PUCCH/PUSCH payload of UL communication if the payload meets a size requirement. The threshold size requirement may be determined based on single-payload information 656 stored in a memory. In one example, the circuitry for single payload combination 642 may bundle a UCI such as an SR with a larger payload. The larger payload may include one or more types of UCIs (e.g., CSI, CQI, HARQ ACK/NACK, etc.) and a data portion for PUCCH/PUSCH transmission. While the SR may include one or more bits indicating whether the scheduled entity 600 is requesting resources for UL data transmissions, the SR may increase in bit-size when additional bits are added to convey information about the amount and/or type of resources the scheduled entity 600 needs. For example, in addition to the one bit, the SR can also include a buffer status report (BSR). In this case, data bits may be stored in a buffer or memory 605 as single payload information 656 prior to being communicated in an UL transmission. The BSR can include the number of bits stored in buffer, providing the scheduling entity with information regarding an amount of resources the scheduled entity 600 needs. The BSR may include explicit data indicating the length of the buffer. However, in some examples, the BSR may provide data that of reduced granularity than that of the explicit length to reduce latency. In such a case, with no more than two bits, the BSR can indicate a general capacity of the buffer. The BSR may include a first data including explicit information indicating the length of the buffer. However, in some examples, the BSR may instead include a second data including information of a reduced granularity relative to that of the first data to reduce latency. For example, instead of providing explicit information indicating the length of the buffer, the BSR may be reduced in bit size to indicate a general capacity of the buffer. In such a case, the BSR may be reduced to no more than two bits. A BSR being reduced to no more than two bits is being used an example in this disclosure, and other number of bits are contemplated. The circuitry for single payload combination 642 may determine to communicate the BSR having the first data or the second data based on various priority metrics associated with one or more of the UCI or the PUCCH/PUSCH payload.

In another example, the circuitry for single payload combination 642 may bundle a UCI into a single payload opportunistically based on resources available to either, or both of, the scheduled entity 600 and the scheduling entity. For example, the scheduled entity 600 may operate by reserving resources for sending requested information, and limiting bundling of information to instances when the information is requested. In such a case, an RRC, MAC-CE (MAC Control Element), DCI, or other control command exchange can trigger the scheduled entity to report a UCI (e.g., CQI, PMI, RI, PTI, etc.), which can be bundled so long as the reported UCI meets the threshold size. Alternatively, the RRC, MAC-CE, DCI, or other control command exchange may specify the threshold size.

In one or more examples, the computer-readable storage medium 606 may include DMRS sequence determination software 650 configured for various functions, including, for example, selecting a first DMRS sequence from a plurality of DMRS sequences to be used in an UL message, wherein one or more of the DMRS sequences are configured to communicated a UCI, and transmit the UL message. The DMRS sequence determination software 650 may also be configured to receive an UL message including a DMRS sequence and at least one UCI, and determining the at least one UCI based on the DMRS sequence in the UL message. For example, the DMRS sequence determination software 650 may be configured to implement one or more of the functions described above in relation to FIGS. 7 and 9, including, e.g., blocks 702 and 704.

In one or more examples, the computer-readable storage medium 606 may include single payload combination software 652 configured for various functions, including, for example, determining a bit size of a UCI, comparing the bit size of the UCI with a threshold value based on the size of a payload, determining whether the UCI bit size is greater than the threshold value, determining whether UCI can be embedded in the DMRS, and combining the UCI with the payload. For example, the single payload combination software 652 may be configured to implement one or more of the functions described above in relation to FIG. 8, including, e.g., blocks 802-810.

Figure 7:
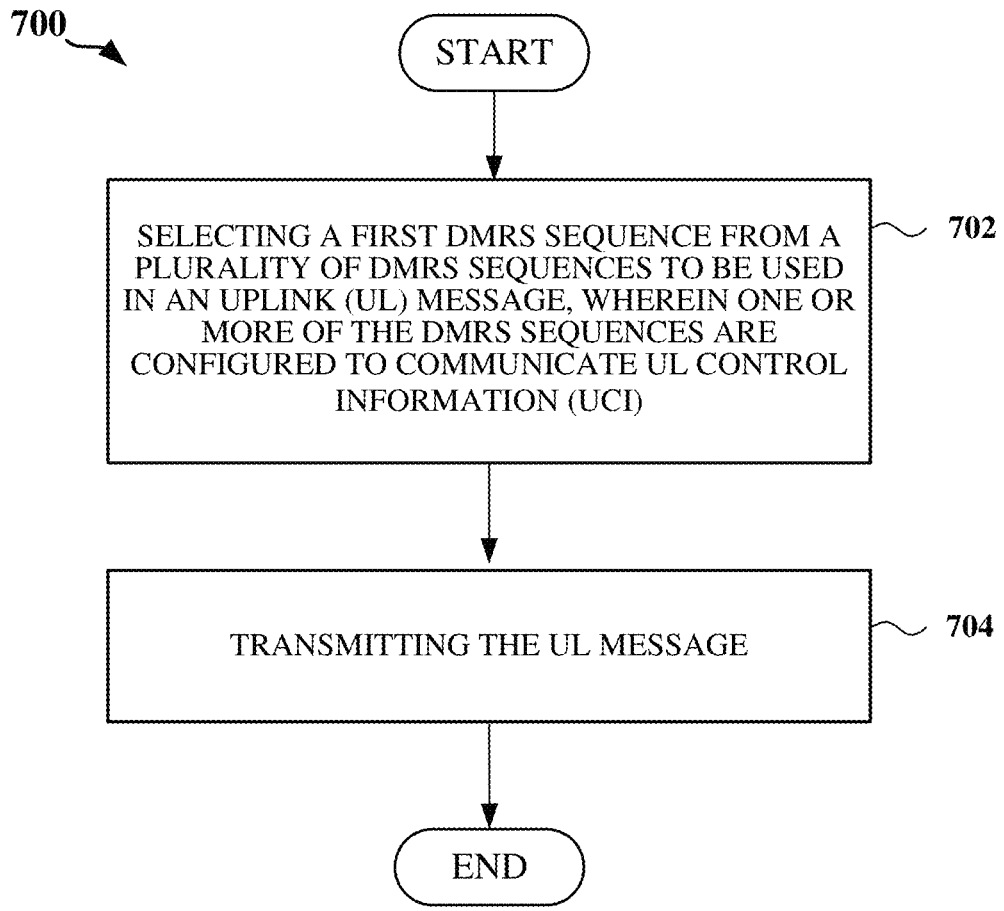
FIG. 7 is a flow chart illustrating an exemplary process for transmitting uplink (UL) control information within a demodulation reference signal according to some aspects of the disclosure.

FIG. 7 is a flow chart illustrating an exemplary process 700 for embedding uplink control information within a DMRS in a UL message. As described below, some or all illustrated features may be omitted in a particular implementation within the scope of the present disclosure, and some illustrated features may not be required for implementation of all embodiments. In some examples, the process 700 may be carried out by the scheduling entity 500 and/or the scheduled entity 600 illustrated in FIGS. 5 and 6, respectively. In some examples, the process 700 may be carried out by any suitable apparatus or means for carrying out the functions or algorithm described below At block 702, a scheduled entity 600 chooses a DMRS sequence from N known sequences that are stored on a memory 605 as DMRS information 654. In one example, the UL burst 408 of the DL-centric slot 400, and the UL data region 456 and UL burst region 458 of the UL-centric slot 450 can each include one or more DMRS sequences. A DMRS sequence may occupy one or more resource elements 306 in each UL region. In this way, $\log_2(N)$ bits of uplink control information (UCI) can be communicated using specific DMRS sequences. The UCI may include one or more of a HARQ ACK/NACK, an SR, a CSI, a CQI, a PMI, an RI, a PTI, a DTX/DRX, etc. The DMRS sequence may be chosen based on the UCI information to be communicated using a look-up table that is stored within the DMRS information 654 on a memory 605. The look-up table may include particular UCI information and/or particular combinations of UCI information that correspond to each of the N known DMRS sequences.

In one configuration, the scheduled entity 600 may select at least one DMRS sequence for a UL transmission, and configure the UL data region 456 and/or the UL burst region 458 to include the selected sequence(s). For example, the scheduled entity 600 may communicate a HARQ ACK message by selecting a corresponding DMRS sequence for transmission in the UL data region 456. The same process can be used in the UL burst region 408 of the DL-centric slot 400. Note that any suitable number of DMRS sequences N may be utilized to correspond to any UCI payload X. DMRS sequences can be chosen by the first UE to be orthogonal to one another or have low cross correlation between one another.

DMRS sequences may have an embedded pilot sub-sequence that is common among all or a portion of the N possible choices of DMRS sequences. The embedded pilot sub-sequences may be utilized for channel estimation to aid in detecting which DMRS sequence was transmitted. For example, a common pilot sub-sequence (e.g., a first pilot sub-sequence) may be embedded in DMRS sequence 1 (corresponding to a first ACK), DMRS sequence 2 (corresponding to a first NACK), and DMRS sequence 3 (corresponding to a first DTX). In another example, in addition to the first pilot sub-sequence being embedded in DMRS sequences 1-3, a second pilot sub-sequence may be embedded in a DMRS sequence 4 (corresponding to a second ACK), a DMRS sequence 5 (corresponding to a second NACK), and a DMRS sequence 6 (corresponding to a second DTX). In this example, the first pilot sub-sequence is distinguishable from the second pilot sub-sequence.

In another example, each of the N possible choices of DMRS sequences or the portion of the N DMRS sequences may include a unique embedded pilot sub-sequence. In this example, a single DMRS sequence may correspond to a plurality of UCIs. However, the single DMRS sequence may include an embedded pilot sub-sequences that corresponds to a unique one of the plurality of UCIs. Thus, a common DMRS sequence may be used to communicate a plurality of UCIs, wherein the embedded pilot sub-sequence distinguishes the common DMRS sequence to a unique one of the plurality of UCIs.

In another example, the value of N may be limited to reduce complexity. For example, the value of N may be chosen to carry non-binary UCI types. In one non-limiting example, setting N=3 may allow for a three-state UCI provided within the corresponding DMRS. One example of a three-state UCI may include a three-state ACK that can provide information that is in addition to the standard ACK/NACK. The three-state ACK can reflect complex states, such as, (i) no PDCCH detected, (ii) PDCCH detected but PDSCH CRC failed, and (iii) PDCCH detected and PDSCH CRC passed. As such, it may be possible to distinguish between the PDCCH not being detected, and the PDCCH being detected but the CRC failing after decoding the corresponding PDSCH. In this case, a scheduled entity 106 may provide an ACK (i.e., PDCCH detected and PDSCH CRC passed), a NACK (i.e., PDCCH detected but PDSCH CRC failed), or a discontinued transmission/reception (DTX/DRX) message over the DMRS. The three-state ACK is being used as an example, however other non-binary UCI types and corresponding N values are contemplated.

In another example, the scheduled entity 600 can assign a first power level to a UCI carried by a DMRS sequence of a slot, and a second power level to another UCI being communicated in the payload of the same slot. For example, the scheduled entity 600 may generate an UL message containing a first UCI (e.g., a 2-bit ACK) via a DMRS sequence, as well as a second UCI (e.g., a 1-bit ACK) via a PUCCH. In this example, the generated UL message may be a three-state ACK. As such, the first UCI and the second UCI can be assigned different reliability requirements due to demodulation requirements being different for each. For example, scheduled entity 600 can modulate a transmission power level of each of the first UCI and the second UCI to indicate distinctive decoding reliability requirements for each UCI. In this example, the scheduled entity 600 may increase the transmission power level on information deemed important (e.g., the first UCI of the DMRS), and decrease (i.e., reduce relative to the increase power level, or leave at a nominal or default level) the power for information that is relatively less important (e.g., the second UCI of the PUCCH). Selectively modulating power allows the scheduled entity 600 to generate a delta offset between different UCIs of the same slot to indicate degrees of reliability, and also to employ power saving measures.

In another configuration, the scheduled entity may control latency requirements of different UCIs by strategically configuring a particular arrangement of the UCIs within a slot. Such a configuration is beneficial for establishing a timeline prioritization of information. As noted above, the DMRS sequence is generally "up front" or at the beginning of any of the UL burst and/or UL data region of a slot. As such, this property of the DMRS sequence can be utilized to front-load a particular UCI (e.g., a first UCI) in the UL region of a transmission. For example, if the scheduled entity 600 is generating a UL-centric slot 450 that includes at least two UCIs, the scheduled entity 600 can determine that the first UCI should receive timeline prioritization over a second UCI. In this case, the first UCI may be carried on the DMRS and the second UCI may be carried via the PUCCH. In this example, the arrangement of the UCIs within the slot results in the first UCI being processed earlier than the second UCI. In this example, the scheduled entity 600 may establish a timeline of prioritization by generating an UL message where one or more DMRS sequences are selected based on a priority of one or more UCIs.

In one aspect, the priority of a UCI may be a function of a priority of data that the UCI is in response to. For example, if the UCI is a 1-bit ACK associated with mission critical data received by the scheduled entity 600, then the scheduled entity may generate an UL message by selecting a DMRS sequence associated with a 1-bit ACK instead of transmitting the 1-bit ACK by the PUCCH. In this example, the priority of the 1-bit ACK is established by the priority of the mission critical data received by the scheduled entity 600. In some configurations, mission critical data refers to data that has a relatively high reliability requirement. For example, the reliability requirement of mission critical data may be greater than the reliability requirement of other data included in that subframe. Generally, reliability refers to how consistently data is successfully received by the intended destination without errors.

In another aspect, the priority of the UCI may be a function of the type of UCI. For example, the priority may be determined by characteristics of the UCI, including number of bits, whether the UCI includes a CSI, an ACK, a NACK, and/or an SR. In one such example, a 1-bit UCI may have a relatively higher priority established by the number of bits of the UCI, whereas a 2-bit ACK may have a relatively lower priority due to having a greater number of bits. As such, whether the scheduled entity 600 selects a particular DMRS sequence for a UCI may be a function of one or more of the (i) the priority of the data that the UCI is in response to, (ii) the type of UCI, and (iii) the bit size of the UCI.

At block 704, the scheduled entity 600 transmits the UL message containing the first DMRS sequence.

In one configuration, the scheduling entity 500 and/or the scheduled entity 600 for wireless communication includes means for selecting a first DMRS sequence from a plurality of DMRS sequences to be used in an UL message, wherein one or more of the DMRS sequences are configured to communicate a UCI, and transmitting the UL message. In one aspect, the aforementioned means may be the processors 504 and/or 604. In another aspect, the aforementioned means may be the transceivers 510 and/or 610, configured to perform the functions recited in the aforementioned means. In another aspect, the aforementioned means may be a circuit or any apparatus configured to perform the functions recited by the aforementioned means.

Figure 8:
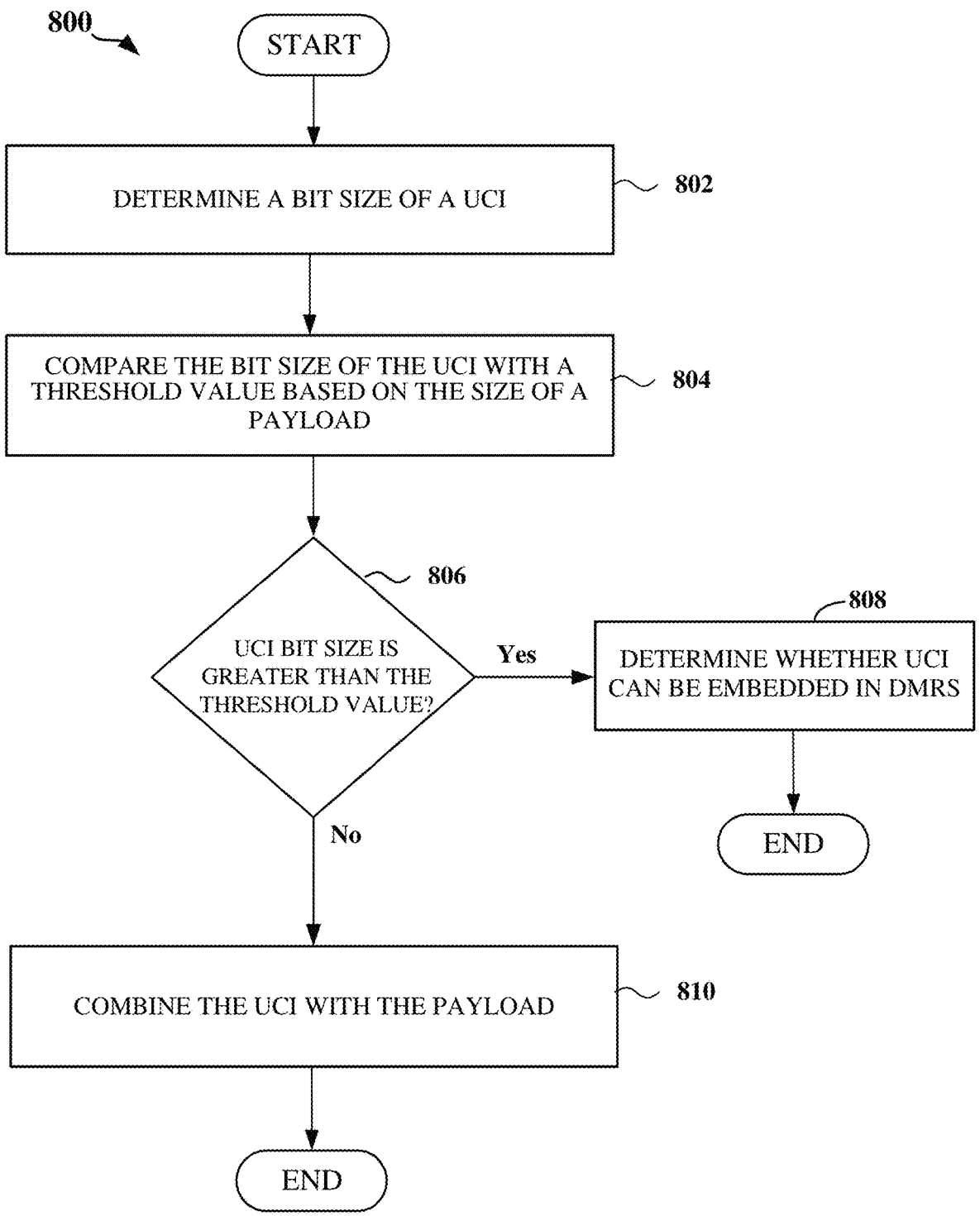
FIG. 8 is a flow chart illustrating an example process for combining uplink control information with a payload in an uplink message communicated between two wireless nodes according to some aspects of the disclosure.

FIG. 8 is a flow chart illustrating an exemplary process 800 for adding a UCI to a payload. The payload may include one or more types of other UCI information, and may also include data payload for PUSCH transmission. As described below, some or all illustrated features may be omitted in a particular implementation within the scope of the present disclosure, and some illustrated features may not be required for implementation of all embodiments. In some examples, the process 800 may be carried out by the scheduling entity 500 and/or the scheduled entity 600 illustrated in FIGS. 5 and 6, respectively. In some examples, the process 800 may be carried out by any suitable apparatus or means for carrying out the functions or algorithm described below.

At block 802, the scheduled entity 600 determines a bit size of the UCI. There are a number of reasons for why the number of UCI bits may change. For example, a scheduled entity receiving multiple-input and multiple-output (MIMO) transmissions can receive DL data over one, two, or many different data streams at different times. In such a case, the UCI corresponding to the ACK would vary accordingly, with a different ACK needed for each of the different data streams.

Also, at one time, the scheduling entity may request channel state feedback (CSF) for a single wideband channel estimate; while at another time, the scheduling entity may request CSF for many different narrowband channel estimates. UCI bit-size may also vary based on latency reducing measures. For example, reduced latency of control information via DMRS sequencing may indirectly reduce other UCI and/or data aspects due to faster transport of control signaling.

At block 804, the scheduled entity 600 compares the bit size of the UCI with a threshold value that is determined based on the size of the payload, where payload may include one or more types of UCI and may also include data payload for PUSCH transmission. In some configurations, as the bit size of the payload increases, so too does the bit size of UCI that is allowed to be added to the payload. As such, the allowable bit size of the UCI is a function of the bit size of the payload.

At block 806, the scheduled entity 600 determines whether the bit size of the UCI is greater than the threshold value. If the UCI bit size is greater than the threshold value, then the process move on to block 808. If the UCI bit size is not greater than the threshold value, then the process moves on to block 810.

At block 808, the scheduled entity 600 determines whether the UCI can be embedded in a DMRS of the UL message. If the UCI can be embedded, then the process moves on to that shown in FIG. 7. If the UCI cannot be embedded in a DMRS, then the UCI is transmitted at the next available opportunity.

At block 810, the scheduled entity 600 combines the UCI with the payload.

In one configuration, the scheduling entity 500 and/or the scheduled entity 600 for wireless communication includes means for determining a bit size of a UCI, comparing the bit size of the UCI with a threshold value based on the size of a payload, determining whether the UCI bit size is greater than the threshold value, determining whether the UCI can be embedded in the DMRS, and combining the UCI with the payload. In one aspect, the aforementioned means may be the processors 504 and/or 604. In another aspect, the aforementioned means may be the transceivers 510 and/or 610, configured to perform the functions recited in the aforementioned means. In another aspect, the aforementioned means may be a circuit or any apparatus configured to perform the functions recited by the aforementioned means.

Figure 9:
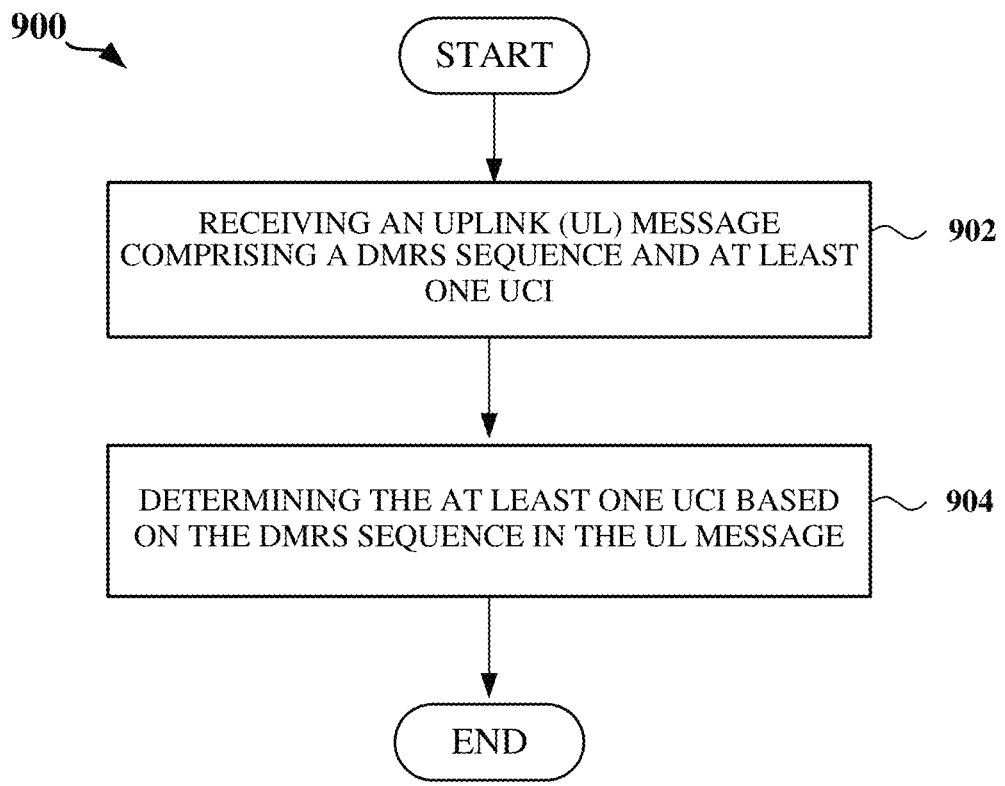
FIG. 9 is a flow chart illustrating an example process for determining at least one uplink control information (UCI) based on a DMRS sequence in an UL message according to some aspects of the disclosure.

FIG. 9 is a flow chart illustrating an exemplary process 900 for receiving an UL message having a DMRS sequence that includes at least one UCI in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduling entity 500 and/or the scheduled entity 600 illustrated in FIGS. 5 and 6, respectively. In some examples, the process 900 may be carried out by any suitable apparatus or means for carrying out the functions or algorithm described below.

At block 902, a scheduling entity 500 may receive an UL message including a DMRS sequence and at least one UCI via a transceiver 510. The UCI may include one or more of a HARQ ACK/NACK, an SR, CSI, CQI, PMI, RI, PTI, DTX/DRX, etc. The received UL message may include the UCI payload within the DMRS. A set of N possible DMRS sequences may be known between a scheduling entity 500 and the entity that transmitted the UL message (e.g., scheduled entity 600). For example, DMRS information 554 containing the N possible DMRS sequences may be stored in a memory 505 on each of the scheduling entity 500 and the scheduled entity 600. In another embodiment, the set of N possible DMRS sequences may also be known to a another scheduled entity, thereby allowing direct D2D communication between the scheduled entity 600 and both of the other scheduled entity and the scheduling entity 500. The DMRS information 554 may include a look-up table having particular UCI information and/or particular combinations of UCI information that correspond to each of the N known DMRS sequences.

At block 904, when the scheduling entity 500 receives the UL transmission including the DMRS sequence, it may determine which DMRS sequence was communicated in the UL transmission by confirming a relationship between the DMRS sequence and the UCI payload. In one example, the scheduling entity 500 may establish a magnitude of correlation against the N possible DMRS sequences in the stored DMRS information 554 to determine which DMRS sequence was communicated in the UL transmission.

DMRS sequences may have an embedded pilot sub-sequence that is common among all or a portion of the N possible choices of DMRS sequences. The embedded pilot sub-sequences may be utilized for channel estimation to aid in detecting which DMRS sequence was transmitted. For example, a common pilot sub-sequence (e.g., a first pilot sub-sequence) may be embedded in DMRS sequence 1 (corresponding to a first ACK), DMRS sequence 2 (corresponding to a first NACK), and DMRS sequence 3 (corresponding to a first DTX). In another example, in addition to the first pilot sub-sequence being embedded in DMRS sequences 1-3, a second pilot sub-sequence may be embedded in a DMRS sequence 4 (corresponding to a second ACK), a DMRS sequence 5 (corresponding to a second NACK), and a DMRS sequence 6 (corresponding to a second DTX). In this example, the first pilot sub-sequence is distinguishable from the second pilot sub-sequence. Such distinguishing features may be utilized by the scheduling entity 500 to establish a parameter corresponding to the wireless entity (e.g., scheduled entity 600) that transmitted the UL message. In another example, each of the N possible choices of DMRS sequences or the portion of the N DMRS sequences may include a unique embedded pilot sub-sequence. In this example, a single DMRS sequence may correspond to a plurality of UCIs. However, the single DMRS sequence may include an embedded pilot sub-sequences that corresponds to a unique one of the plurality of UCIs. Thus, a common DMRS sequence may be used to communicate a plurality of UCIs, wherein the embedded pilot sub-sequence distinguishes the common DMRS sequence to a unique one of the plurality of UCIs.

In one embodiment, the value of N may be limited to reduce complexity. For example, the value of N may be chosen to carry non-binary UCI types. In one non-limiting example, setting N=3 may allow for a three-state UCI provided within the corresponding DMRS. One example of a three-state UCI may include a three-state ACK that can provide information that is in addition to the standard ACK/NACK. The three-state ACK can reflect complex states, such as, (i) no PDCCH detected, (ii) PDCCH detected but PDSCH CRC failed, and (iii) PDCCH detected and PDSCH CRC passed. As such, it may be possible to distinguish between the PDCCH not being detected, and the PDCCH being detected but the CRC failing after decoding the corresponding PDSCH. In this case, the scheduling entity 500 may receive an ACK (i.e., PDCCH detected and PDSCH CRC passed), a NACK (i.e., PDCCH detected but PDSCH CRC failed), or a discontinued transmission/reception (DTX/DRX) message over the DMRS. The three-state ACK is being used as an example, however other non-binary UCI types and corresponding N values are contemplated. The scheduling entity 500 may determine which non-binary UCI type was embedded in the received DMRS sequence by confirming a relationship between the DMRS sequence and/or the pilot sub-sequence, and the UCI payload.

In one configuration, the scheduling entity 500 and/or the scheduled entity 600 for wireless communication includes means for receiving an UL message including a DMRS sequence and at least one UCI, and determining the at least one UCI based on the DMRS sequence in the UL message. In one aspect, the aforementioned means may be the processors 504 and/or 604. In another aspect, the aforementioned means may be the transceivers 510 and/or 610, configured to perform the functions recited in the aforementioned means. In another aspect, the aforementioned means may be a circuit or any apparatus configured to perform the functions recited by the aforementioned means.

Of course, in the above examples, the circuitry included in the processor 504 and/or 604 is merely provided as an example, and other means for carrying out the described functions may be included within various aspects of the present disclosure, including but not limited to the instructions stored in the computer-readable storage medium 506 and/or 606, or any other suitable apparatus or means described in any one of the FIG. 1, 2, 5 or 6, and utilizing, for example, the processes and/or algorithms described herein in relation to FIGS. 7, 8, and/or 9.

Additional Considerations

Although several aspects of this disclosure are presented with reference to communication of uplink control information (UCI) data over uplink channels, those skilled in the art will readily appreciate that those aspects may be extended to communication of downlink (DL) data. By way of example, DL information may be embedded in a demodulation reference signal (DMRS) and communicated over a physical channel using methods and devices similar to those described above. In another example, DL data may be combined with other DL data in a single payload using methods and devices similar to those described above.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of communicating information embedded in a demodulation reference signal (DMRS) sequence, comprising:

selecting a first DMRS sequence from a plurality of DMRS sequences to be used in a wireless communication comprising an uplink (UL) message, wherein one or more of the plurality of DMRS sequences are configured to communicate control information comprising uplink control information (UCI) embedded therein over a physical channel, and wherein the plurality of DMRS sequences comprise a set of N DMRS sequences configured to communicate $\log_2(N)$ bits of UCI; and transmitting the wireless communication.

2. The method of claim 1, wherein the UCI includes one or more of a hybrid automatic repeat request (HARQ) acknowledgment (ACK), HARQ non-acknowledgment (NACK), a scheduling request (SR), or channel state information (CSI).

3. The method of claim 1, further comprising determining to communicate a specific UCI, wherein the first DMRS sequence corresponds to the specific UCI.

4. The method of claim 1, wherein the first DMRS sequence is selected from a look-up table stored on a memory device.

5. The method of claim 4, wherein the look-up table comprises a one-to-one correspondence between the first DMRS sequence and the UCI.

6. The method of claim 1, further comprising selecting a pilot sub-sequence to be embedded in the selected first DMRS sequence.

7. The method of claim 6, wherein a combination of the first DMRS sequence and the pilot sub-sequence is configured to communicate the UCI.

8. The method of claim 1, further comprising:
receiving DMRS information comprising a look-up table including the plurality of DMRS sequences and UCI corresponding to each of the plurality of DMRS sequences; and
storing the DMRS information in a memory device.

9. A method of communicating information embedded in a demodulation reference signal (DMRS) sequence, comprising:
receiving DMRS information comprising a look-up table including a plurality of DMRS sequences and uplink control information (UCI) corresponding to each of the plurality of DMRS sequences;
storing the DMRS information in a memory device;
selecting a first DMRS sequence from a plurality of DMRS sequences to be used in a wireless communication comprising an uplink (UL) message, wherein one or more of the plurality of DMRS sequences are configured to communicate control information comprising uplink control information (UCI) embedded therein over a physical channel; and
transmitting the wireless communication.

10. The method of claim 9, wherein the UCI includes one or more of a hybrid automatic repeat request (HARQ) acknowledgment (ACK), HARQ non-acknowledgment (NACK), a scheduling request (SR), or channel state information (CSI).

11. The method of claim 9, wherein the plurality of DMRS sequences comprise a set of N DMRS sequences configured to communicate $\log_2(N)$ bits of UCI.

12. The method of claim 9, further comprising determining to communicate a specific UCI, wherein the first DMRS sequence corresponds to the specific UCI.

13. The method of claim 9, wherein the look-up table comprises a one-to-one correspondence between the first DMRS sequence and the UCI.

14. The method of claim 9, further comprising selecting a pilot sub-sequence to be embedded in the selected first DMRS sequence.

15. The method of claim 14, wherein a combination of the first DMRS sequence and the pilot sub-sequence is configured to communicate the UCI.

16. An apparatus for wireless communication of information embedded in a demodulation reference signal (DMRS), the apparatus comprising:
a transceiver;
a memory; and
at least one processor communicatively coupled to the transceiver and the memory, wherein the at least one processor is configured to:
select a first DMRS sequence from a plurality of DMRS sequences to be used in a wireless communication comprising an uplink (UL) message, wherein one or more of the plurality of DMRS sequences are configured to communicate control information comprising uplink control information (UCI) embedded therein over a physical channel, and wherein the plurality of DMRS sequences comprise a set of N DMRS sequences configured to communicate $\log_2(N)$ bits of UCI; and
transmit, via the transceiver, the wireless communication.

17. The apparatus of claim 16, wherein the UCI includes one or more of a hybrid automatic repeat request (HARQ) acknowledgment (ACK), HARQ non-acknowledgment (NACK), a scheduling request (SR), or channel state information (CSI).

18. The apparatus of claim 16, wherein the first DMRS sequence is selected from a look-up table stored on the memory.

19. The apparatus of claim 18, wherein the look-up table comprises a one-to-one correspondence between the first DMRS sequence and the UCI.

20. The apparatus of claim 16, wherein the at least one processor is further configured to select a pilot sub-sequence to be embedded in the selected first DMRS sequence.

21. The apparatus of claim 20, wherein a combination of the first DMRS sequence and the pilot sub-sequence is configured to communicate the UCI.

22. The apparatus of claim 16, wherein the at least one processor is further configured to:
receive DMRS information comprising a look-up table including the plurality of DMRS sequences and one or more UCIs corresponding to each of the plurality of DMRS sequences; and
store the DMRS information in a memory device.

23. An apparatus for wireless communication of information embedded in a demodulation reference signal (DMRS), the apparatus comprising:
a transceiver;
a memory; and
at least one processor communicatively coupled to the transceiver and the memory, wherein the at least one processor is configured to:
receive DMRS information comprising a look-up table including a plurality of DMRS sequences and uplink control information (UCI) corresponding to each of the plurality of DMRS sequences;
store the DMRS information in the memory;
select a first DMRS sequence from a plurality of DMRS sequences to be used in a wireless communication comprising an uplink (UL) message, wherein one or more of the plurality of DMRS sequences are configured to communicate control information comprising uplink control information (UCI) embedded therein over a physical channel; and
transmit, via the transceiver, the wireless communication.

24. The apparatus of claim 23, wherein the UCI includes one or more of a hybrid automatic repeat request (HARQ) acknowledgment (ACK), HARQ non-acknowledgment (NACK), a scheduling request (SR), or channel state information (CSI).

25. The apparatus of claim 23, wherein the plurality of DMRS sequences comprise a set of NDMRS sequences configured to communicate $\log_2(N)$ bits of UCI.

26. The apparatus of claim 23, wherein the look-up table comprises a one-to-one correspondence between the first DMRS sequence and the UCI.

27. The apparatus of claim 23, wherein the at least one processor is further configured to select a pilot sub-sequence to be embedded in the selected first DMRS sequence.

28. The apparatus of claim 27, wherein a combination of the first DMRS sequence and the pilot sub-sequence is configured to communicate the UCI.

29. An apparatus for wireless communication of information embedded in a demodulation reference signal (DMRS), the apparatus comprising:

means for selecting a first DMRS sequence from a plurality of DMRS sequences to be used in a wireless communication comprising an uplink (UL) message, wherein one or more of the plurality of DMRS sequences are configured to communicate control information comprising uplink control information (UCI) embedded therein over a physical channel, and wherein the plurality of DMRS sequences comprise a set of N DMRS sequences configured to communicate $\log_2(N)$ bits of UCI; and means for transmitting the wireless communication.

30. The apparatus of claim 29, wherein the UCI includes one or more of a hybrid automatic repeat request (HARQ) acknowledgment (ACK), HARQ non-acknowledgment (NACK), a scheduling request (SR), or channel state information (CSI).

31. The apparatus of claim 29, further comprising means for determining to communicate a specific UCI, wherein the first DMRS sequence corresponds to the specific UCI.

32. The apparatus of claim 29, wherein the first DMRS sequence is selected from a look-up table stored on a memory device.

33. The apparatus of claim 32, wherein the look-up table comprises a one-to-one correspondence between the first DMRS sequence and the UCI.

34. The apparatus of claim 29, further comprising means for selecting a pilot sub-sequence to be embedded in the selected first DMRS sequence.

35. The apparatus of claim 34, wherein a combination of the first DMRS sequence and the pilot sub-sequence is configured to communicate the UCI.

36. The apparatus of claim 29, further comprising:

means for receiving DMRS information comprising a look-up table including the plurality of DMRS sequences and UCI corresponding to each of the plurality of DMRS sequences; and means for storing the DMRS information.

37. An apparatus for wireless communication of information embedded in a demodulation reference signal (DMRS), the apparatus comprising:

means for receiving DMRS information comprising a look-up table including a plurality of DMRS sequences and uplink control information (UCI) corresponding to each of the plurality of DMRS sequences;

means for storing the DMRS information;

means for selecting a first DMRS sequence from a plurality of DMRS sequences to be used in a wireless communication comprising an uplink (UL) message, wherein one or more of the plurality of DMRS sequences are configured to communicate control information comprising uplink control information (UCI) embedded therein over a physical channel; and means for transmitting the wireless communication.

38. The apparatus of claim 37, wherein the UCI includes one or more of a hybrid automatic repeat request (HARQ) acknowledgment (ACK), HARQ non-acknowledgment (NACK), a scheduling request (SR), or channel state information (CSI).

39. The apparatus of claim 37, wherein the plurality of DMRS sequences comprise a set of N DMRS sequences configured to communicate $\log_2(N)$ bits of UCI.

40. The apparatus of claim 37, wherein the look-up table comprises a one-to-one correspondence between the first DMRS sequence and the UCI.

41. The apparatus of claim 37, further comprising means for selecting a pilot sub-sequence to be embedded in the selected first DMRS sequence.

42. The apparatus of claim 37, wherein a combination of the first DMRS sequence and the pilot sub-sequence is configured to communicate the UCI.

\* \* \* \* \*